March 24, 1936.  G. J. OLSON  2,034,919
SPROCKET ATTACHMENT FOR TRACTORS
Filed Feb. 4, 1935
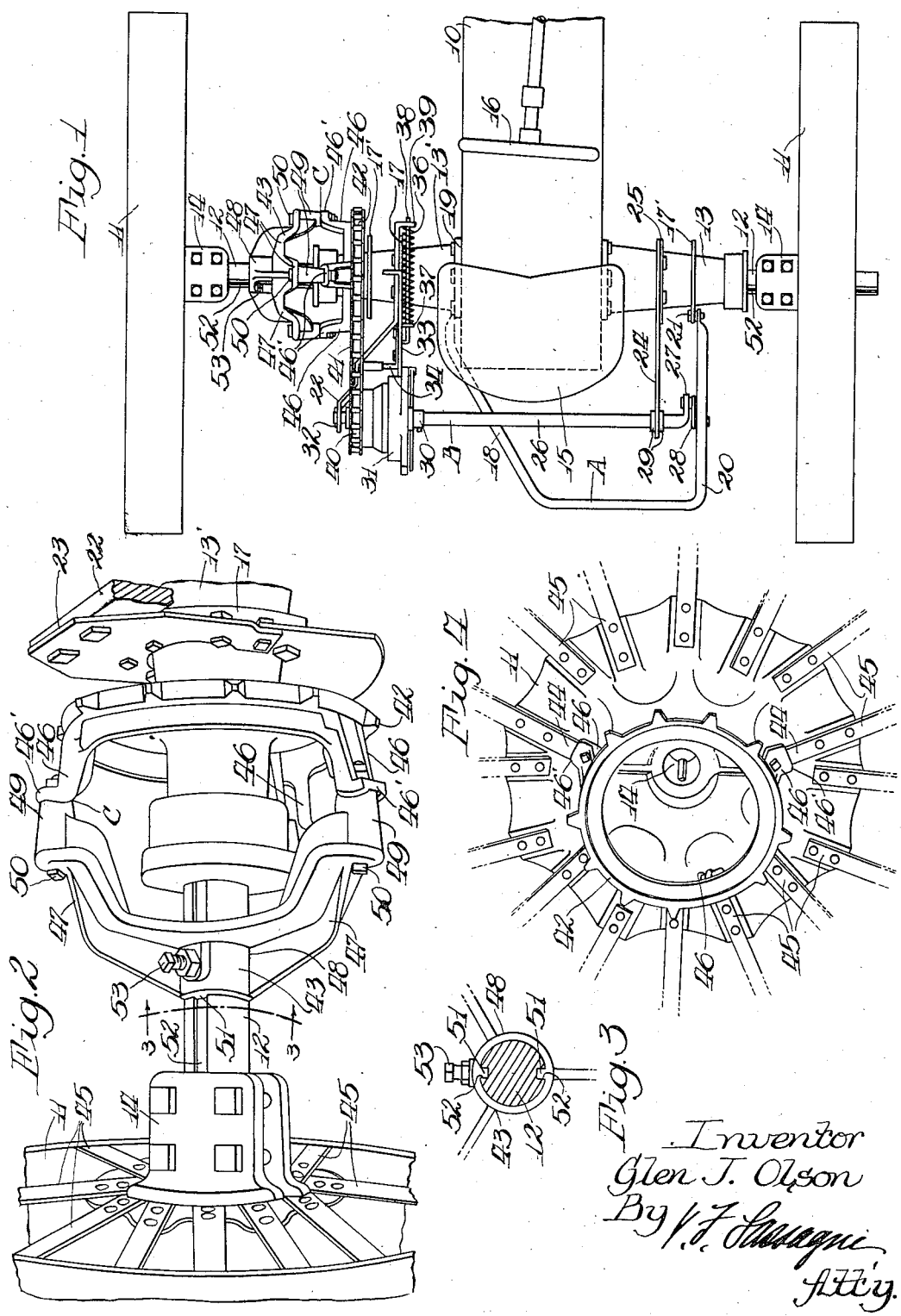
Inventor
Glen J. Olson
By V. F. Sauage
Atty.

Patented Mar. 24, 1936

2,034,919

UNITED STATES PATENT OFFICE 2,034,919

SPROCKET ATTACHMENT FOR TRACTORS

Glen J. Olson, Canton, Ill., assignor to International Harvester Company, a corporation of New Jersey Application February 4, 1935, Serial No. 4,775

10 Claims. (Cl. 180—53)

This invention relates to tractor operated tillage implements for tractors of a well known tricycle type with the rear wheels adjustable for a plurality of wheel spacings and in which implement attachments are driven from the tractor.

Usually, attachments driven from the tractor in this manner are driven from a sprocket attached to the spokes of the rear tractor wheels or from a sprocket attached to the rear axle. Where, as in the instance of side hill plowing, it is sometimes desirable to adjust the rear wheels to an extended position to obtain a greater stability for the tractor, the sprocket, which was in its correct position to operate an attachment, is now out of alignment and it is necessary to provide some means for connecting the sprocket properly, so that it may operate the tractor attachment.

The main object of the invention is to provide a tractor attachment adapted to connect a sprocket, of the type adapted to be attached to a tractor wheel, to the rear axle shaft of the tractor in a manner to be adjustable thereon and to be driven therefrom to supply power to a tractor drawn implement.

In accomplishing the foregoing object and other minor objects, which will hereinafter be more specifically described and defined in the claims, the preferred forms of the improved details of structure are illustrated in the accompanying drawing, wherein:

Figure 1 is a plan view of a tractor with a rear axle with wheels adjustable thereon, showing the attachment in place connected to a power lifting device for a tractor draw-bar.

Figure 2 is an enlarged perspective of the rear wheel and axle of the tractor, showing the invention mounted on the axle of the tractor;

Figure 3 is a section on the line 3—3 of Figure 2, looking in the direction of the arrows, showing how the adapter is secured to the axle; and, Figure 4 is a perspective of the tractor wheel, showing the sprocket attached to the wheel.

The invention is herein disclosed in combination with a tractor 10 of the wide tread type having rear wheels 11 adjustably mounted for various spacings on the rear axle shafts 12, rotatably supported in the right and left rear axle housings 13 and 13'. The wheels 11 may be reversed in their position from that shown in Figure 1, which shows the manner in which the widest spacing of the rear wheels may be obtained with the hub clamps 14 on the inside. The wheel spacing may be narrowed by placing the wheels as shown in Figure 4, with the hubs 14 on the outside. The tractor 10 is driven from the operator's station 15 by the steering wheel 16. Integral with the rear right and left axle housings 13 and 13' and symmetrically placed, are the inner and outer flanges 17 and 17', respectively, to which the various tractor drawn implements, draw-bar A and power lift attachment B, as shown, may be attached.

The left side 18 of the U-shaped draw-bar A is pivotally attached to the tractor housing 19, and the right side 20 of the draw-bar is pivotally attached to the draw-bar hanger 21 secured to the outer flange 17' on the right hand housing 13. The draw-bar A may have attached to or trailed from it any form of tractor drawn implement that may be desired.

The power lift attachment B is supported from the tractor housing 13' on the left side by a frame rail 22 secured to an upper flange plate 23, which is, in turn, secured to the inner flange 17 on the left housing 13'. On the right side, the power lift attachment is supported by the frame rail 24, which is secured to the flange plate 25 attached to the inner flange 17 on the right rear axle housing 13. The left frame rail extends rearwardly, laterally and upwardly, and at the rear end pivotally supports the transverse clutch shaft 26 of the power lift attachment B. The right frame rail 24 extends rearwardly and upwardly, and pivotally supports the transverse clutch shaft 26 in alignment with the pivot support in the left frame rail 22. The transverse clutch shaft 26 extends to the right of the frame rail 24 and has an L-shaped extending portion 27 to which is pivotally attached the pick-up rod 28 pivotally connected at its lower end to the midportion of the right side 20 of the draw-bar attachment A. The transverse clutch shaft 26 is held in lateral alignment by the adjusting collars 29 on either side of the right frame rail 24, and by the adjusting collar 30, and by the right side of the power lift clutch 31 of the one-half revolution type. A cotter key 32 prevents the clutch shaft from slipping out of the left hand frame rail 22. A throw-out lever 33 is pivoted to a supporting bracket 34 pivotally attached to the left frame rail 22. The throw-out lever 33 at all times resiliently engages the clutch 31 unless it is thrown out of engagement to operate the clutch 31, because a compression spring 36, co-acting with a collar 37 on the spring rod 38 and an inwardly extending bracket 39 integral with the left frame rail 22 through which the spring rod is slidably mounted, tends to force the lower end of the lever 33 always in engagement with the clutch. The spring rod 38 is pivoted at its rear end to the lever supporting bracket 34, and at its front end it is slidably mounted in the extending bracket 39. The power lift clutch 31 is driven by the clutch sprocket 40 rotatably mounted on the clutch shaft 26. The clutch sprocket 40 is driven at all times that the tractor is in gear through the sprocket chain 41 by the drive sprocket 42 adapted to be driven from the left rear axle 12 by the sprocket adapter hub 43. It is to be understood that the drive sprocket 42, connected to the sprocket adapter hub 43, may operate other mechanisms than the power lift attachment B, as shown, such as the transverse shafts of planting mechanism, or the like.

The sprocket 42 with its adapter hub 43 is generally used only when it is necessary to extend the wheel treads, as shown in Figure 1, when the tractor is used for side hill work, though the sprocket attachment C may be used in other mechanisms as occasion warrants. Normally, the sprocket 42 is securely attached to extensions 44 on the spokes 45 by the extending arms or spiders 46 with the lugs 46' thereon grooved to fit the spoke extensions 44 of the tractor wheel 11, as best shown in Figure 4. This permits the sprocket 42 to have the same alignment as shown in Figure 1.

Figures 1 and 2 show the tractor wheels extended and the sprocket 42 attached in the same alignment that the sprocket would have, if directly attached to the wheel 11. To attach the sprocket 42 in this manner, the sprocket is unbolted from the wheel as it is shown in Figure 4, and the wheel 11 is then removed from the rear axle 12. The adapter hub 43 is placed on the rear axle 12, as best shown in Figure 2, and sprocket 42 is secured as shown. The wheel 11 is then replaced with the hub clamp 14 extending inwardly, and the wheel 11 is then adjusted laterally to whatever wheel position is desirable. The adapter hub 43 has extending radially supporting arms 47 extending from a centrally positioned hub portion 48. Supported from the outer portions of the supporting arms 47 are the lug portions 49 fitted to the complementary grooved lugs 46' of the sprocket 42. Bolts 50 pass through holes in the lug portions 49 securing the sprocket 42 to the adapter 43. The adapter 43 is adjustably mounted laterally on the rear axle 12 through the key-shaped portions 51, which also serve to transmit the power of the axle to the hub. The key-shaped portions 51 are so proportioned as to be slidably mounted in the keyways 52 in the rear axles 12. The adapter attachment is secured in adjusted position by means of the set screw and lock nut 53. By the construction of the adapter hub 43 just described, a simple attachment has been provided for driving a sprocket which is mounted inwardly from the rear axle and surrounds the rear axle housing of the tractor.

In the operation of the adapter attachment, the drive sprocket 42, which generally is attached to the wheel 11, as shown in Figure 4, has been attached to an adapter hub 43 to permit the sprocket 42 to drive the power lift attachment B, as described, or other suitable mechanism, although the wheel 11, to which the sprocket 42 was attached, has been turned around and extended laterally on the rear axle 12.

It will be evident that there has been provided an attachment which may be readily connected to and disconnected from the rear axle of a tractor, having adjustable wheels, to a drive sprocket which formerly was connected to the tractor wheel for furnishing power to drive various mechanisms, and that the attachment which has been disclosed affords an organization particularly well adapted for multi-row cultivation in which the rear drive wheels are adjustably mounted on the rear axle. It is to be understood that materials suitable for the stresses encountered in an attachment of this nature are to be used.

The preferred embodiment of the invention herein described is capable of certain modifications without departure from the scope of the invention to be defined in the following claims.

What is claimed is:

1. The combination with a tractor having a rear axle and wheels mounted thereon, and having implement attachments driven from the power of the tractor mounted thereon, of an implement driving element, an adapter hub mounted on said rear axle, and means on the driving element for securing it to said adapter hub or one of the wheels, selectively.

2. The combination with a tractor having a rear axle and splined means thereon for adjusting the rear wheels laterally thereon, and having implement attachments driven from the power of the tractor mounted thereon, of an adapter hub mounted on said rear axle, complementary splined means on said adapter hub for engaging said splined rear axle, and means mounted on said adapter hub for driving said implement attachments.

3. The combination with a tractor having a rear axle and splined means thereon for adjusting the rear wheels laterally thereon, and having implement attachments driven from the power of the tractor mounted thereon, of an adapter hub mounted on said rear axle and laterally adjustable thereon by complementary splined means on said adapter hub for engaging said splined rear axle, means for securing said adapter hub in adjusted position, and means mounted on said adapter hub for driving said implement attachments.

4. The combination with a tractor having a rear axle and wheels mounted thereon, and having implement attachments driven from the power of the tractor mounted thereon, of an implement driving element, an adapter hub mounted on said rear axle comprising means for axially adjusting said adapter hub on said rear axle, means mounted on said adapter hub for receiving the driving element, means on said adapter hub for offsetting laterally the driving element to align said driving element with the driven means on said implement attachments, and means on the driving element for securing it to said receiving means on the adapter hub or on one of the wheels, selectively.

5. In the combination as set forth in claim 4, said rear axle having splined means thereon for laterally adjusting the rear wheels, complementary splined means on said adapter hub for engaging said splined rear axle, and means for securing said adapter hub in adjusted position.

6. An adapter attachment for tractors having a rear axle and a drive wheel mounted thereon, and having implement attachments driven from drive means normally mounted on said drive wheel, comprising means for mounting said adapter attachment on said rear axle, and outwardly and radially extending supporting means for mounting said drive means on said adapter attachment whereby said drive means, normally driven from said drive wheel, may be driven from said rear axle.

7. An adapter attachment for tractors having a splined rear axle and a drive wheel mounted thereon, and having implement attachments driven from drive means normally mounted on said drive wheel, comprising means for adjustably mounting said adapter attachment on said splined rear axle, means for securing said adapter attachment in adjusted position, and outwardly and radially extending supporting means for mounting said drive means on said adapter attachment whereby said drive means, normally driven from said drive wheel, may be driven from said rear axle.

8. In an adapter attachment as set forth in claim 6, lugs secured to said supporting means for offsetting said drive means whereby said drive means on said adapter attachment may be aligned with said driven means on said implement attachments.

9. In an adapter attachment as set forth in claim 6, said drive means having spaced attaching means for mounting said drive means on said drive wheel, lugs on said adapter attachment for offsetting said drive means whereby said drive means on said adapter attachment may be aligned with said drive means on said implement attachment, and means for securing said spaced attaching means on said drive means to said lugs on said adapter attachment.

10. An adapter attachment for the transmission of motion from a driving means having radially extending offset arms on a rotating member to drive a driven member, comprising means for mounting said attachment on said rotating member, means for adjusting said attachment laterally on said rotating member, means for securing said adapter attachment in adjusted position, means comprising radially extending offset arms for mounting said drive means on said adapter attachment in alignment with said driven member, and means for securing said radially extending offset arms of said drive means to the radially extending offset arms of said adapter attachment.

GLEN J. OLSON.